Figure 1:
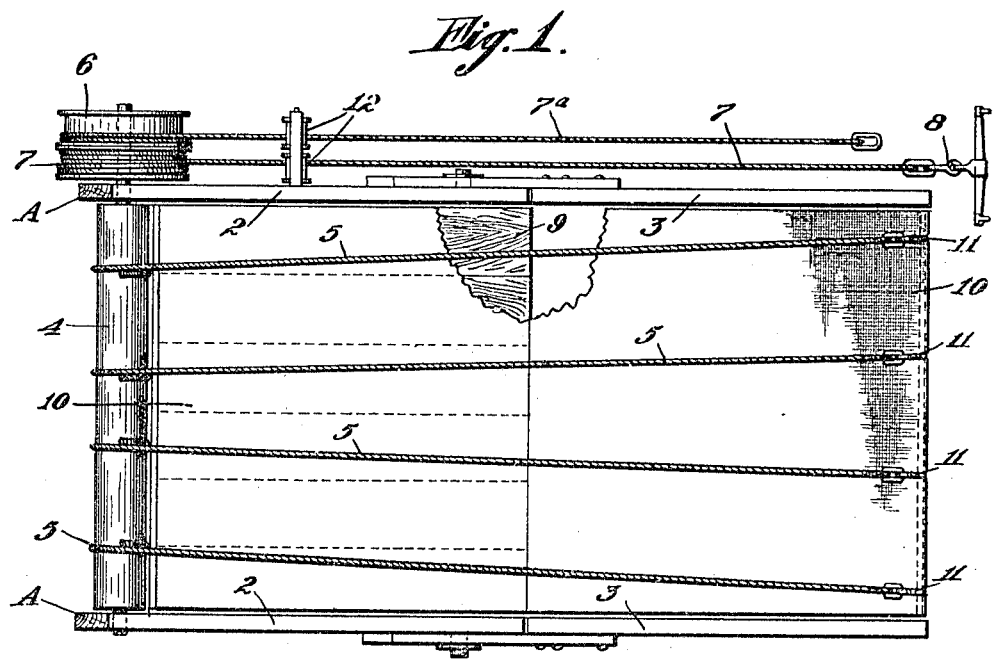

J. NICHOL.
LOADING APPARATUS.
APPLICATION FILED JULY 21, 1909.

954,328.

Patented Apr. 5, 1910.
2 SHEETS—SHEET 1.

WITNESSES;
R. S. Berry,
F. E. Maynard.

INVENTOR
JAMES NICHOL
BY Geo. H. Strong
HIS ATTORNEY.

J. NICHOL.
LOADING APPARATUS.
APPLICATION FILED JULY 21, 1909.
954,328.
Patented Apr. 5, 1910.
2 SHEETS—SHEET 2.
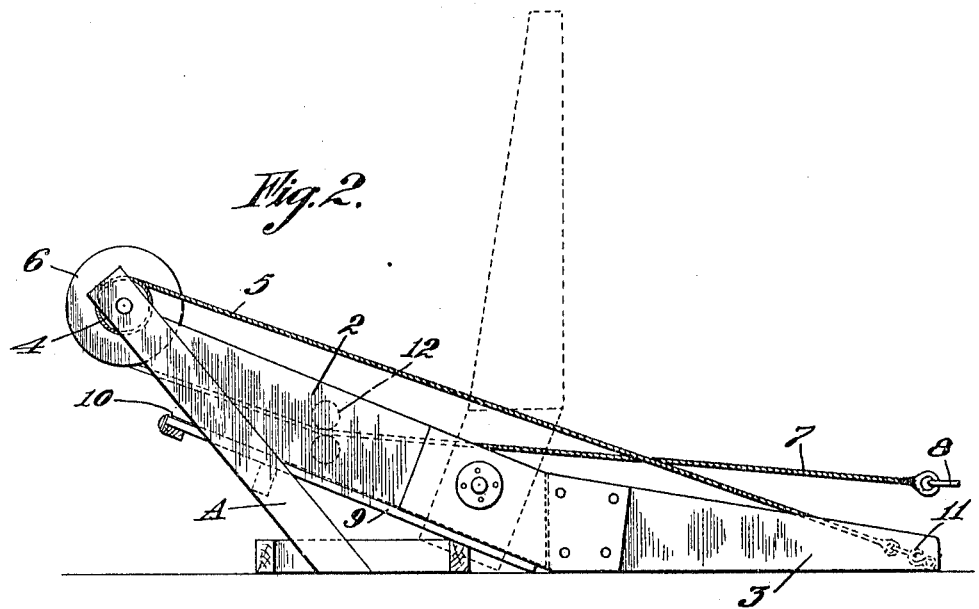
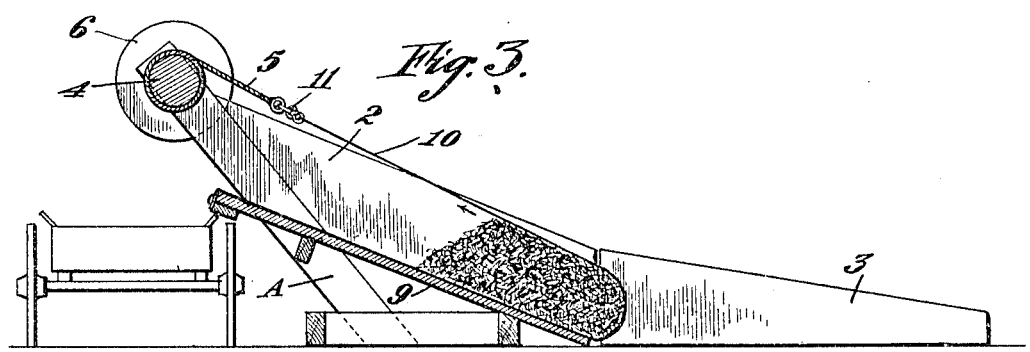
WITNESSES:
INVENTOR
JAMES NICHOL
HIS ATTORNEY.

UNITED STATES PATENT OFFICE.

JAMES NICHOL, OF YERINGTON, NEVADA.

LOADING APPARATUS.

954,328.      Specification of Letters Patent.      Patented Apr. 5, 1910.

Application filed July 21, 1909. Serial No. 508,719.

*To all whom it may concern:*

Be it known that I, JAMES NICHOL, a citizen of the United States, residing at Yerington, in the county of Lyon and State of Nevada, have invented new and useful Improvements in Loading Apparatus, of which the following is a specification.

My invention relates to an apparatus which is designed to gather and raise manure, or like heavy material from the ground and to deliver it into wagons or upon elevations.

It consists of a partially horizontal and partially inclined framework having a substantially closed bottom and a belt or apron having one edge attached to the upper rear portion of the bottom, adapted to be extended downwardly and outwardly over said bottom, and having means for attachment to its outer edge so that when loaded, by means of power applied to it, the flexible bottom may be drawn upwardly to roll the load to the point of discharge.

It also comprises certain details of construction and combination of parts as hereinafter more fully described and claimed, having reference to the accompanying drawings, in which:

Figure 1 is a plan view. Fig. 2 is a side elevation. Fig. 3 is a sectional view showing the manner of raising the load.

It is the object of my invention to provide a device which is capable of being loaded with heavy material while lying upon the ground, and afterward to be folded upon itself in such manner as to carry the load upwardly upon an incline to a point of convenient discharge.

As shown in the drawings, the framework A forms a base and support, a portion of which is inclined backwardly and rearwardly, as shown, and is provided with fixed sides 2. To these fixed sides may be hinged or pivoted the movable sides 3, which can be turned upwardly and backwardly, as shown in dotted lines in Fig. 2. Across the upper end of the frame A is journaled a drum or roller 4, adapted to have ropes 5 coiled upon it. Upon the end of the drum shaft is a drum or pulley 6, around which may be coiled a winding rope 7, and this is adapted to have attached to its forward end the traction device at 8, so that by attaching the team and pulling upon 6, the rope will be uncoiled from the drum, thus revolving the drum and the roller 4. A closed inclined bottom 9 extends between the fixed sides 2, and to the upper end of this bottom is firmly secured a flexible apron 10. This apron is of sufficient length to extend down to the inclined bottom and to a considerable distance forward of the lower edge of the surface upon which the apparatus stands. In this position it is in condition to receive a load upon the forwardly extended surface. The hinged sides 3 may be turned down so as to form extensions of the sides 2, either before or after a load has been placed upon the apron. This load may be delivered upon the apron by means of forks, shovels, or by any suitable or known means for transferring material, and when the apron is loaded it is in condition for the elevation of the load.

The front of the apron is provided with a series of attachments 11, and the ropes 5, which pass around the drum 4, may be drawn downwardly so as to be attached to the front of the apron by means of the connections 11, then by revolving the roller 4, as previously described, or any other equivalent manner, the front edge of the apron 10 will be drawn up, the rear edge remaining fixed to the supporting platform, and as a result the load will be folded within the apron, rolled over and over as the edge of the apron is drawn up, until the load is finally in position to be delivered from the upper edge of the inclined bottom 9. A vehicle of any description may be located beneath this edge so as to receive the contents of the apron as it is discharged. It will be seen that when the hinged sides 3 are turned downwardly upon each side of the apron, they will prevent the escape of material at the sides, and they may be conveniently turned up out of the way when the apron is extended in condition to receive this load. The parts may be returned to their normal position by attaching the team to a second rope $7^a$, which winds about the pulley 6 in opposite direction from that taken by the rope 7. All the connections may be made with the attachments on the edge of the apron 10, and it can be pulled out and extended for another load.

12 are guide rollers between which the ropes 7 and $7^a$ pass, and by which the direction of pull of these ropes is maintained during the operation.

Having thus described my invention, what I claim as new and desire to secure by Letters-Patent, is:

1. In a loading device, the combination of an inclined floor, an extension from the front edge of said floor, said extension being hinged to the floor and adapted to be folded in an upwardly direction, a roller journaled above the upper edge of the floor, ropes secured to the roller and adapted to be coiled thereon, a flexible apron extending transversely across the bottom between the sides thereof, means for connecting the front ends of the ropes to the lower edge of the apron, and means for applying power to revolve said roller whereby the ropes are wound upon the roller and the apron is folded upon itself and the load folded within the apron and rolled upwardly over the discharge end of said floor.

2. In a loading device, an inclined bottom with fixed sides, a flexible apron having its upper edge secured to the upper edge of the floor and its lower edge capable of extending beyond the lower edge of the floor, hinged or pivoted sides forming extensions of the fixed sides upon each side of the apron when extended, a roller journaled above the rear edge of the floor, ropes fixed to the roller, means for connecting the ropes with the front edge of the apron after the latter is loaded, and means for revolving the roller and winding up the ropes and apron.

In testimony whereof I have hereunto set my hand in the presence of two subscribing witnesses.

JAMES NICHOL.

Witnesses:
 VICTOR C. BERNARD,
 ANGUS McLEOD.